United States Patent
Kennedy, III et al.

(10) Patent No.: US 7,320,648 B2
(45) Date of Patent: Jan. 22, 2008

(54) GOLF BALL

(75) Inventors: Thomas J. Kennedy, III, Wilbraham, MA (US); Mark L. Binette, Ludlow, MA (US); Vincent J. Simonds, Brimfield, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 11/275,781

(22) Filed: Jan. 27, 2006

(65) Prior Publication Data

US 2006/0084528 A1   Apr. 20, 2006

Related U.S. Application Data

(63) Continuation-in-part of application No. 11/152,446, filed on Jun. 13, 2005, now abandoned, which is a continuation of application No. 09/877,600, filed on Jun. 8, 2001, now Pat. No. 6,905,424, which is a continuation of application No. 09/411,690, filed on Oct. 1, 1999, now Pat. No. 6,290,614, which is a continuation-in-part of application No. 09/040,798, filed on Mar. 18, 1998, now Pat. No. 6,855,073.

(51) Int. Cl.
*A63B 37/08* (2006.01)

(52) U.S. Cl. ..................................... 473/354
(58) Field of Classification Search ............... 473/354, 473/376
See application file for complete search history.

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |

(Continued)

FOREIGN PATENT DOCUMENTS

GB   2278609   * 12/1994

*Primary Examiner*—Raeann Trimiew
(74) *Attorney, Agent, or Firm*—Michael A. Catania; Elaine H. Lo (57) ABSTRACT

A golfball comprising a liquid core and a reaction-injection-molded (RIM) cover material is disclosed. The liquid core comprises a core shell defining a hollow region, the hollow region containing a fluid. The reaction-injection-molded material may be a reaction-injection-molded polyurethane, a reaction-injection-molded polyurea, a reaction-injection-molded polyurethane/polyurea blend, or mixtures thereof. A golfball with a liquid core and RIM cover exhibits variable spin characteristics and a larger spin decay.

1 Claim, 1 Drawing Sheet

U.S. PATENT DOCUMENTS

| | | |
|---|---|---|
| 4,248,432 A | 2/1981 | Hewitt et al. |
| 4,272,079 A | 6/1981 | Nakade et al. |
| 4,274,637 A | 6/1981 | Molitor |
| 4,337,946 A | 7/1982 | Saito et al. |
| 4,431,193 A | 2/1984 | Nesbitt |
| 4,442,282 A | 4/1984 | Kolycheck |
| 4,570,937 A | 2/1986 | Yamada |
| 4,582,887 A | 4/1986 | Dominguez et al. |
| 4,590,219 A | 5/1986 | Nissen et al. |
| 4,607,090 A | 8/1986 | Dominguez |
| 4,650,193 A | 3/1987 | Molitor et al. |
| 4,674,751 A | 6/1987 | Molitor et al. |
| 4,679,795 A | 7/1987 | Melvin et al. |
| 4,688,801 A | 8/1987 | Reiter |
| 4,690,981 A | 9/1987 | Slatz |
| 4,695,055 A | 9/1987 | Newcomb et al. |
| 4,714,253 A | 12/1987 | Nakahara et al. |
| 4,762,322 A | 8/1988 | Molitor et al. |
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A * | 11/1989 | Newcomb et al. .......... 473/200 |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 5,683,312 A * | 11/1997 | Boehm et al. ............... 473/354 |
| 5,885,172 A * | 3/1999 | Hebert et al. ................ 473/354 |

* cited by examiner

GOLF BALL

CROSS REFERENCES TO RELATED APPLICATIONS

This Application is a continuation-in-part application of U.S. patent application Ser. No. 11/152,446, filed on Jun. 13, 2005, now abandoned which is a continuation application of U.S. patent application Ser. No. 09/877,600, filed on Jun. 8, 2001, now U.S. Pat. No. 6,905,424, which is a continuation application of U.S. patent application Ser. No. 09/411,690, filed on Oct. 1, 1999, now U.S. Pat. No. 6,290,614, which is a continuation-in-part application of U.S. patent application Ser. No. 09/040,798, filed on Mar. 18, 1998, now U.S. Pat. No. 6,855,073.

STATEMENT REGARDING FEDERALLY SPONSORED RESEARCH OR DEVELOPMENT

Not Applicable

BACKGROUND OF THE INVENTION

1. Field of the Invention

The present disclosure relates, in various embodiments, to golfballs. In particular, the present disclosure relates to a golfball having a liquid core and a cover layer comprising a reaction-injection-molded (RIM) material.

2. Description of the Related Art

Spin rate is an important golfball characteristic for both the skilled and unskilled golfer. High spin rates allow for the more skilled golfer, such as PGA professionals and low handicap players, to maximize control of the golfball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golfball exhibiting high spin rate properties.

A high spin golfball, however, is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golfball, a more efficient ball for the less skilled player is a golfball that exhibits low spin properties. A low spin ball reduces slicing and hooking and enhances roll distance for the amateur golfer.

The present disclosure relates to the need for developing a golfball having a reduced spin rate after club impact, while at the same time maintaining durability, playability and resiliency characteristics necessary for repetitive play.

In this regard, top-grade golfballs sold in the United States maybe generally classified as one of three types: two-piece, three-piece balls, or multi-layer golfballs. The two-piece ball consists of a solid polymeric core and a separately formed outer cover. The so-called three-piece balls or wound balls consist of a liquid or solid center, elastomeric thread windings about the center, and a cover. A multi-layer golfball is a solid, non-wound golfball comprising one or more core, intermediate and/or cover layers.

Two-piece golfballs are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener are added directly to the generally "off white" colored polymeric cover composition prior to molding.

With respect to multi-layered golfballs, one or more intermediate or cover layers are molded around a generally solid core. Optionally, one or more core layers may also be included in the molded core. Depending upon the two-piece or multi-layer ball construction, the balls vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.). This varies depending upon the ball's core, intermediate and cover layers, coating materials, as well as the ball's surface configuration (i.e. dimple pattern). Consequently, two-piece and multi-layer golfballs offer both the amateur and professional golfer a variety of performance characteristics to suit an individual's game.

In regard to the specific components of a golfball, although the nature of the cover can, in certain instances, make a significant contribution to the overall feel, spin (control), coefficient of restitution (C.O.R.) and initial velocity of a ball (see, for example, U.S. Pat. No. 3,819,768 to Molitor), the initial velocity of two-piece, three-piece, and multi-layer balls is determined mainly by the coefficient of restitution of the core. The coefficient of restitution of the core of wound (i.e. three-piece) balls can be controlled within limits by regulating the winding tension and the thread and center composition. With respect to two-piece and multi-layer balls, the coefficient of restitution of the core is a function of the properties of the elastomer composition from which it is made.

The cover component of a golfball is particularly influential in effecting the compression (feel), spin rates (control), distance (C.O.R.), and durability (i.e. impact resistance, etc.) of the resulting ball. Various cover compositions have been developed in order to optimize the desired properties of the resulting golfballs.

Over the last several years, improvements in cover, intermediate and core material formulations and changes in dimple patterns have more or less continually improved golfball distance. Top-grade golfballs, however, must meet several other important design criteria. To successfully compete in today's golfball market, a golfball should be resistant to cutting and must be finished well; it should hold a line in putting and should have good click and feel. In addition, the ball should exhibit spin and control properties dictated by the skill and experience of the end user.

Prior artisans have attempted to incorporate metal layers or metal filler particles in golf balls to alter the physical characteristics and performance of the balls. For example, U.S. Pat. No. 3,031,194 to Strayer is directed to the use of a spherical inner metal layer that is bonded or otherwise adhered to a resilient inner constituent within the ball. The ball utilizes a liquid filled core. U.S. Pat. No. 4,863,167 to Matsuki, et al. describes golfballs containing a gravity filler which may be formed from one or more metals disposed within a solid rubber-based core. U.S. Pat. Nos. 4,886,275 and 4,995,613, both to Walker, disclose golfballs having a dense metal-containing core. U.S. Pat. No. 4,943,055 to Corley is directed to a weighted warm-up ball having a metal center.

Prior artisans have also described golfballs having one or more interior layers formed from a metal, and which feature a hollow center. Davis disclosed a golfball comprising a spherical steel shell having a hollow air-filled center in U.S. Pat. No. 697,816. Kempshall received numerous patents directed to golfballs having metal inner layers and hollow interiors, such as U.S. Pat. Nos. 704,748; 704,838; 713,772; and 739,753. In U.S. Pat. Nos. 1,182,604 and 1,182,605, Wadsworth described golfballs utilizing concentric spherical shells formed from tempered steel. U.S. Pat. No. 1,568,514 to Lewis describes several embodiments for a golfball, one of which utilizes multiple steel shells disposed within the ball, and which provide a hollow center for the ball.

Prior artisans have attempted to provide golfballs having liquid filled centers. Toland described a golfball having a liquid core in U.S. Pat. No. 4,805,914. Toland describes improved performance by removing dissolved gases present in the liquid to decrease the degree of compressibility of the liquid core. U.S. Pat. No. 5,037,104 to Watanabe, et al. and U.S. Pat. No. 5,194,191 to Nomura, et al. disclose thread wound golfballs having liquid cores. Similarly, U.S. Pat. No. 5,421,580 to Sugimoto, et al. and U.S. Pat. No. 5,511,791 to Ebisuno, et al. are both directed to thread wound golfballs having liquid cores limited to a particular range of viscosities or diameters. Moreover, Molitor, et al. described golfballs with liquid centers in U.S. Pat. Nos. 5,150,906 and 5,480,155.

Two U.S. patents disclosing a golfball having a metal mantle layer in combination with a liquid core are U.S. Pat. No. 3,031,194 to Strayer and the previously noted U.S. Pat. No. 1,568,514 to Lewis. Unfortunately, the ball constructions and design teachings disclosed in these patents involve a large number of layers of different materials, relatively complicated or intricate manufacturing requirements, and/or utilize materials that have long been considered unacceptable for the present golfball market.

Concerning attempts to provide golfballs with cellular or foamed polymeric materials utilized as a core, few approaches have been proposed. U.S. Pat. No. 4,839,116 to Puckett, et al. discloses a short distance golfball. It is believed that artisans considered the use of foam or a cellular material undesirable in a golfball, perhaps from a believed loss or decrease in the coefficient of restitution of a ball utilizing a cellular core.

Although satisfactory in at least some respects, all of the foregoing ball constructions, particularly the few utilizing a metal shell and a liquid core, are deficient. This is most evident when considered in view of the stringent demands of the current golf industry. Moreover, the few disclosures of a golfball comprising a cellular or foam material do not motivate one to employ a cellular material in a regulation golfball. Specifically, there is a need for a golfball that exhibits a high initial velocity or coefficient of restitution (C.O.R), may be driven relatively long distances in regulation play, and which may be readily and inexpensively manufactured.

In an alternative embodiment, the spin rate of the ball is further reduced by increasing the thickness of the cover and/or decreasing the weight and softness of the core. By increasing the cover thickness and/or the overall diameter of the resulting molded golfball, enhanced reduction in spin rate is observed.

However, notwithstanding the enhanced cover thickness and/or diameters of these golf balls, it is still desirable to produce a U.S.G.A. regulation golfball having improved low spin properties while maintaining the resilience and durability characteristics necessary for repetitive play.

In golfballs with liquid cores, ball properties such as initial spin rate and spin decay, which affect the flight of the ball, are affected by the fluid dynamics of the liquid core. When struck, the liquid and the cover layer(s) spin at different rates. Over time, the spin rate of the ball drops (decays) as rotational kinetic energy from the spinning ball is transferred to the liquid until the fluid and the ball spin at the same rotational speed.

It is further desirable to provide a golfball having a liquid core and a construction that promotes favorable spin characteristics with both woods and irons. It is also desirable to provide a golfball having variable spin characteristics. Additionally, it is desirable to provide a golfball that exhibits a large spin decay to provide a low spin golfball.

BRIEF SUMMARY OF THE INVENTION

The disclosure provides, in various embodiments thereof, a golfball comprising a liquid core comprising a substantially spherical shell defining a hollow interior region and a liquid disposed within the hollow interior of the shell; and a cover layer disposed about the core, the cover layer comprising a material selected from the group consisting of reaction-injection-molded polyurethane, reaction-injection-molded polyurethane/polyurea, reaction-injection-molded polyurea, and combinations thereof.

The disclosure also provides in various embodiments thereof, a golfball comprising a liquid core; a mantle layer disposed over the core; and a cover layer disposed about the second mantle layer, the cover layer comprising a reaction-injection-molded polyurethane, a reaction-injection-molded polyurethane, a reaction-injection-molded polyurethane/polyurea, a reaction-injection-molded polyurea, and combinations thereof.

Further, the disclosure provides, in embodiments thereof, a golfball comprising a core comprising (i) a substantially spherical shell defining a hollow interior, and (ii) a liquid disposed in the interior of the shell, the core having a Shore D hardness of at least about 50; a cover layer disposed about the core, the cover layer comprising a reaction-injection-molded polyurethane, a reaction-injection-molded polyurethane/polyurea, a reaction-injection-molded polyurea, and combinations thereof; and at least one mantle layer intermediate the core and the cover layer, the at least one mantle layer having a Shore D hardness of at least about 60.

These and other non-limiting features of the disclosure are more particularly described below.

BRIEF DESCRIPTION OF SEVERAL VIEWS OF THE DRAWINGS

The drawings are for the purpose of further describing various aspects a golfball in accordance with the disclosure. The drawings are schematic representation, of a ball in accordance with the disclosure and are not intended to be limiting embodiment, thereof.

DETAILED DESCRIPTION OF THE INVENTION

The present disclosure relates, in various embodiments, to golfballs comprising a liquid core and having a cover comprising a reaction-injection-molded (RIM) material. A golfball in accordance with the present disclosure may be of a two piece construction (comprising a core and a cover), or a multi-piece construction (comprising a core, a cover, and one or more mantle layers disposed between the cover and the core). Multi-piece golfballs also encompass golfballs wherein the mantle layers are considered to be a part of the core construction.

Figure 1:
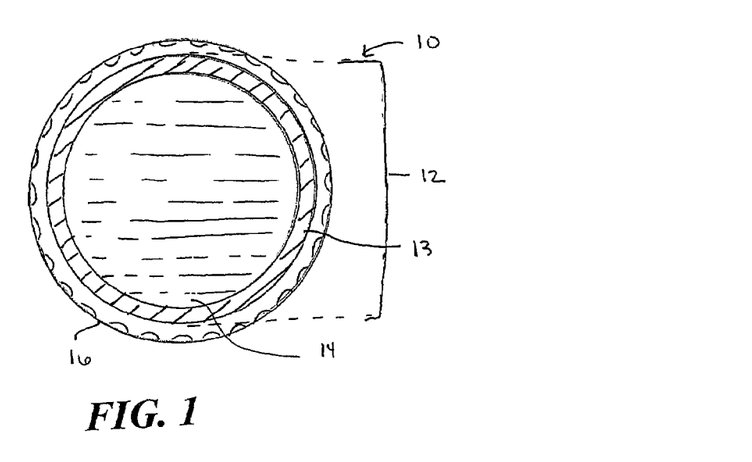
FIG. 1 is a cross sectional view of a two-piece golfball in accordance with the present disclosure.

FIG. 1 illustrates a two-piece golfball in accordance with the present disclosure. Golf ball 10 comprises a core 12 and a cover layer 16 formed over the core. The cover layer 16 comprises a reaction-injection-molded material. Core 12 comprises a shell 13, which defines a hollow region, and a liquid material 14 disposed within the hollow region.

Figure 2:
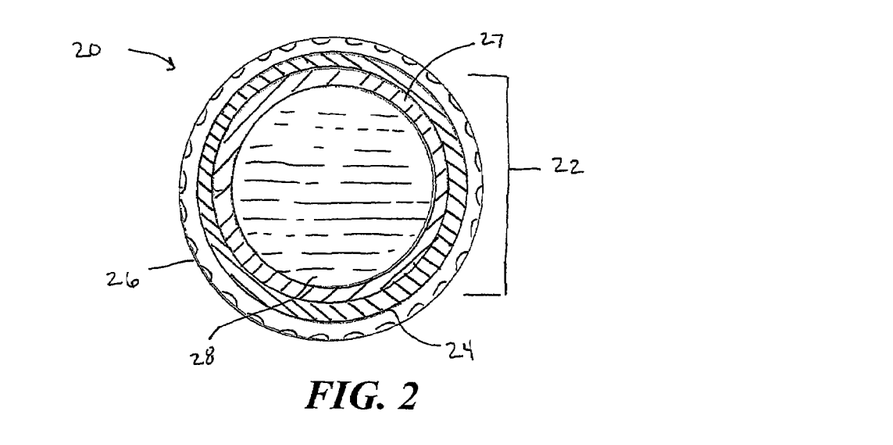
FIG. 2 is a cross sectional view of one embodiment of a multi-layer golfball in accordance with the present disclosure.

FIG. 2 illustrates an embodiment of a multi-layer golfball in accordance with the disclosure. Golf ball 20 comprises a core 22, a mantle layer 24 formed over the core, and a cover layer 26 formed over the mantle layer. Core 22 is formed from a shell 27 defining a hollow region, and the hollow region contains a liquid 28. Cover layer 26 comprises a reaction-injection-molded material.

Figure 3:
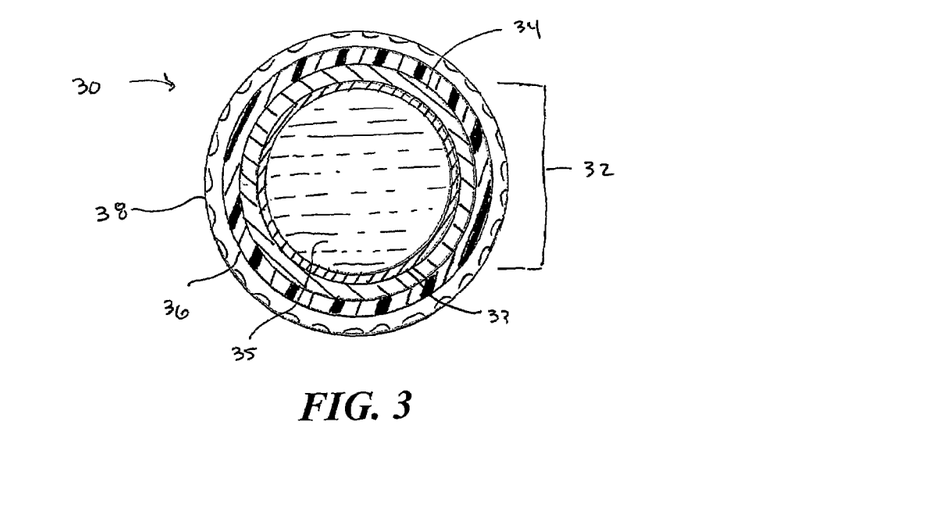
FIG. 3 is a cross sectional view of another embodiment of a multi-layer golfball in accordance with the present disclosure.

FIG. 3 illustrates another embodiment of a multi-layer golfball in accordance with the disclosure. Golf ball 30 includes a core 32, a first mantle layer 34 disposed over the core, a second mantle layer 36 disposed over the first mantle layer, and a cover layer 38 disposed over the second mantle layer. Cover layer 38 includes a reaction-injection-molded material. Core 32 comprises a shell 33 defining a hollow interior region. The hollow interior region contains a liquid 35.

As used herein, the term mantle layer includes any layer(s) disposed between the cover layer and the core shell. Thus, the term mantle layer encompasses both layers considered to be inner cover layers, intermediate layers, and layers considered to be a part of the core structure.

A golfball in accordance with the disclosure includes a liquid core. The liquid material used in the core is not critical. Suitable liquid filled cores include, but are not limited to, those disclosed in U.S. Pat. Nos. 5,480,155 and 5,150,906, both of which are incorporated herein by reference in their entirety. The liquid may be a Newtonian fluid, a non-Newtonian fluid, blends of immiscible fluids, and the like. Suitable liquids for use in the present disclosure golfballs include, but are not limited to, water, alcohol, oil, combinations of these, solutions such as glycol and water, salt and water, and sugar and water. An example of suitable inorganic salt is calcium chloride. An example of a suitable glycol is glycerine. An example of a suitable sugar is fructose. Other suitable liquids include oils or colloidal suspensions, such as clay, barytes, or carbon black in water or other liquid.

In one embodiment the liquid core material is a solution of inorganic salt in water. Suitable inorganic salts include, but are not limited to calcium chloride, sodium, chloride, potassium chloride, zinc chloride, magnesium iodide, calcium iodide, potassium iodide, sodium iodide, and zinc iodide. [PLEASE PROVIDE EXAMPLES].

In another embodiment the liquid is a mixture of sugar and water. Suitable sugars include, but are not limited to sugar, sucrose, fructose, glucose and maltose. Combinations of sugar, salt and water can also be used.

One of the most inexpensive liquids is a salt-water solution. All of the liquids noted in the previously-mentioned '155 and '906 patents are suitable. The density of the liquid can be adjusted to achieve the desired final weight of the golfball.

The properties of the fluid in the liquid core may be selected as desired for a particular purpose or intended. The fluid may be either a low viscosity fluid or a high viscosity fluid. In embodiments, the fluid may have a viscosity of from about 0.5 centipoise ("cPs") to about 5000 cPs. The fluid may have, in embodiments, a specific gravity of at least about 0.85. In still other embodiments, the fluid may have a specific gravity of from about 0.9 to about 2.5.

A liquid core may be prepared or formed by any suitable method. One method includes forming a thin, hollow polymeric sphere by blow molding or forming two half shells and then joining the two half shells together. The hollow sphere is then filled with a suitable liquid and sealed. These techniques are described in the '155 and '906 patents, and U.S. Pat. No. 6,299,550, the entire disclosure of which is incorporated herein by reference.

In embodiments, the shell is initially preformed in the shape of a hollow sphere. As described below, the shell may be made from a synthetic polymeric material(s) and a variety of different manufacturing or fabricating methods maybe utilized to preform the hollow spherical shell. The wall of the shell may be either solid or cellular.

In one embodiment, after or while the shell is being formed, core material may be introduced into the interior of the shell. Preferably the core material is a liquid or a unitary, noncellular material which at the time of its introduction into the shell may be handled as a liquid. As noted below, the core material may, in some embodiments, be introduced into the shell through a hole or holes in the shell or while the shell is being blow molded.

After its introduction, the core material forms a homogeneous core which substantially fills and conforms to the inter surface of the shell. In this latter regard, filling the shell, except for a 1/16-1/8 inch diameter "air " bubble in a conventional sized golfball, constitutes substantially filling the shell since an "air" bubble should not materially detract from or adversely affect the intended performance of the golfball.

The core shell may be made from a variety of materials. Desirable properties for the synthetic polymeric resins, include, but are not limited to, good flowability, moderate stiffness, high abrasion resistance, high tear strength, high resilience, good durability,and good mold release, among others.

An example of suitable polymeric materials for use in the core shell are ionic copolymers. Such copolymers include those that are available under the trademark SURLYN from E.I. DuPont De Nemours & Company of Wilmington, Del. (copolymers of ethylene and methacrylic acid partially neutralized with zinc, sodium, magnesium, or lithium); and those which are available and under the trademarks IOTEK or ESCOR from Exxon Chemical Company, Houston, Tex. (copolymers of ethylene and acrylic acid partially neutralized with zinc or sodium).

Another material suitable for use in a core or shell is sold under the tradename HPF by E.I. DuPont De Nemours & Company of Wilmington, Del. which is composed of highly neutralized acid copolymers and or terpolymers containing a high level of fatty acid salt. Characteristics of HPF™ can be found in U.S. Pat. No. 6,653,382. Use of HPF increases the resilence of the golfball. An example of this material is HPF 1000, an acid copolymer in which all the carboxylic acid groups have been neutralized with magnesium ions and contains a high level of fatty acid salt. HPF type materials neutralized with other metal cations such as sodium, zinc, and calcium may also be used.

Suitable ionomers include mixtures or blends of zinc ("Zn") and sodium ("Na") ionic copolymers. Other types of ionomers also can be used. Both "high acid" and "standard" IOTEK and SURLYN materials can be and have been used, for example, IOTEK 959 (Na) and IOTEK 960 (Zn) (50/50 weight/weight blend); IOTEK 8000 (Na) and IOTEK 7000 (Zn) (75/25 weight/weight blend); SURLYN 8940 (Na) and SURLYN 9910 (Zn) (50/50 weight/weight blend). Non-limiting examples of other suitable ionomers are shown below. The blend ratios are flexible. For example, a 90/10 to 10/90 blend or IOTEK 8000 and IOTEK 7000 is acceptable; the 75/25 blend noted above does give a good cost/performance balance.

Combinations of standard SURLYN (Na/Zn/Mg/Li) materials and high acid IOTEK (Na/Zn) materials, and vice versa, may also be used. For example, the core shell may be formed (e.g., with a diameter of about 1.50 inches) by blow molding, and the shell walls could comprise a single material or layers of different materials, as explained below, and the material(s) could be standard or high acid SURLYN (Na/Zn) materials and/or the IOTEK materials. As noted above, those skilled in this art will recognize that the selection of the specific materials to be used will depend on the particular golfball performance desired.

Ionic copolymers of the type suitable for use in this disclosure are further described in U.S. Pat. No. 3,819,789 issued Jun. 25, 1974, in U.S. Pat. No. 3,264,272 issued Aug. 2, 1966; and U.S. Pat. No. 4,679,795 issued Jul. 14, 1987. Singular ionic copolymers can also be used as the core shell materials. These singular materials are described in U.S. Pat. No. 3,454,280 issued Jul. 8, 1969.

Synthetic polymeric materials, other than those described above, which maybe used in a core shell include, but are not limited to, homopolymeric and copolymer materials which may be adapted for use in this disclosure as follows: (1) vinyl resins formed by the polymerization of vinyl chloride, or by the copolymerization of vinyl chloride with vinyl acetate, acrylic esters or vinylidene chloride; (2) polyolefins such as polyethylene, polypropylene, polybutylene, and copolymers such as polyethylene methylacrylate, polyethylene ethylacrylate, polyethylene vinyl acetate, polyethylene mylic or polyethylene acrylic acid or polypropylene acrylic acid or terpolymers made from these and acrylate esters and their metal ionomers, metallocene catalyzed polyolefins, polypropylene/EPDM grafted with acrylic acid as sold under the trademark POLYBOND by Reichhold Chemicals, Inc., Hackettstown, N.J. 07840, or anhydride modified polyolefins as sold under the trademark PLEXAR by Northern Petrochemical Company, Rolling Meadows, Ill. 60008; (3) polyurethanes, such as are prepared from polyols and diisocyanates or polyisocyanates, including reaction-injection-moldable polyurethanes, castable polyurethanes and injection moldable polyurethanes; (4) polyamides such as poly (hexamethylene adipamide) and others prepared from diamines and dibasic acids, as well as those from amino acids such as poly (caprolactam), and blends of polyamides with ionomers, polyethylene, ethylene copolymers, EDPM, etc.; (5) acrylic resins and blends of these resins with poly vinyl chloride, elastomers, etc.; (6) thermoplastic elastomers such as urethanes, olefinic thermoplastic elastomers such as blends of polyolefins with EPDM, block copolymers of styrene and butadiene and functionalized versions such as KRATON FG, (Shell Chemical Co.), isoprene or ethylene-butylene rubber, thermoplastic block polyamides, including polyether block amides, an example of which is sold under the trademark PEBAX by Elf Atochem (Philadelphia, Pa.); (7) polyphenylene oxide resins, or blends of polyphenylene oxide with high impact polystyrene as sold under the trademark NORYL by General Electric Company, Pittsfield, Mass.; (8) thermoplastic polyesters, such as PET/PETE, PBT, PETG, and elastomers sold under the trademark HYTREL by E.I. DuPont De Nemours & Company of Wilmington, Del. and the trademark LOMOD by General Electric Company of Pittsfield, Mass; and the trademark Eastar and Voridian by Eastman Chemical Company of Kingsport, Tenn; (9) blends and alloys including polycarbonate with ABS, PBT, PET, SMA, PE elastomers, etc. and PVC with ABS or EVA or other elastomers; and (10) Blends of thermoplastic rubbers with polyethylene, polypropylene, polyacetal, nylon, polyesters, cellulose esters, etc; (11) Impact modified nylons sold under tradename Zytel ST801 by from E.I. DuPont De Nemours & Company of Wilmington, Del. In the above description, shorthand symbols are used to describe certain polymers. The symbols used above and their descriptions are as follows: ABS—Acrylonitrile butadiene styrene; PBT—Polybutylene terephthalate; PET/PETE—Polyethylene terephthalate; SMA—Styrene maleic anhydride; PE—Polyethylene; PETG—Polyethylene terephthalatelglycol modified; EPDM—Ethyl-propylene-non-conjugated diene terpolymer; PVC—Polyvinyl chloride; and EVA—Ethylene vinyl acetate.

Additionally, U.S. Pat. No. 5,688,869, also disclose ionomers usable as materials for shells. The above listing is not meant to be limiting or exhaustive, but merely illustrates the wide range of polymeric materials which may be used to form the core shells. Mixtures of the above described materials may also be used. The polymeric materials may optionally be reinforced when utilized in the core shell.

It is also within the purview of this disclosure to add material to the core shell compositions that do not affect the basic novel characteristics of the composition of this disclosure. Among such materials are antioxidants, antistatic agents, and stabilizers.

The cores may have a size of from about 0.620 to about 1.725 inches. In embodiments, the core size is from about 1.40 to about 1.60 inches.

In accordance with various embodiments, the walls of the core shells may have an overall thickness from about 0.060 inches to about 0.614 inches. In other embodiments, the thickness may be between about 0.090 inches and about 0.375 inches. In still other embodiments, between about 0.120 inches and about 0.250 inches.

The core may include one or more layers surrounding the core shell. These additional core layers may allow for or aid, if needed, containment of the liquid. Further, the number and thickness of the additional layers may be selected as desired for a particular purpose or intended use to affect various properties including, durability and performance. When the core shell has one or more layers thereover, each layer may have a thickness of from about 0.020 inches to about 0.614 inches. In some embodiments with one or more additional core layers the layers, including the core shell, may have a thickness of from about 0.080 inches to about 0.500 inches.

The core may have a Shore D hardness of from about 45 to about 85. In embodiments, the core has a hardness of from about 50 to about 80. In still other embodiments, the core has a Shore D hardness of about 75.

The core may have, in embodiments, a C.O.R. of from about 0.600 to about 0.835. In one embodiment, the core has a C.O.R. of about 0.771.

A liquid core is preferable over a solid core in that it develops less spin initially and has greater spin decay resulting in a lower trajectory with increased total distance.

The cover comprises at least one layer. For a multi-layer cover, the cover comprises at least two layers, and it may comprise any number of layers desired, such as two, three, four, five, six and the like. A two piece cover comprises a first or inner layer or ply (also referred to as a mantle layer) and a second or outer layer or ply. The composition of an inner cover layer(s) is not critical. The inner cover layer may be formed from any material suitable as a cover layer in a golfball. An inner cover layer may formed from a soft thermoplastic or thermoset material and serve as a containment layer in case of breakage. Methods of improving interlayer adhesion such as chemical additives, dips or via mechanical means may be necessary to ensure adequate adhesion between layers.

An inner cover layer can be ionomer, ionomer blends, non-ionomer, non-ionomer blends, or blends of ionomer and non-ionomer. In one embodiment of a golfball, an inner cover layer is comprised of a high acid (i.e. greater than 16 weight percent acid) ionomer resin or high acid ionomer blend. More preferably, the inner layer is comprised of a blend of two or more high acid (i.e. greater than 16 weight percent acid) ionomer resins neutralized to various extents by different metal cations. An inner cover layer may or may not include a metal stearate (e.g., calcium stearate, magnesium stearate) or other metal fatty acid salt (e.g., magnesium oleate). The purpose of the metal stearate or other metal fatty acid salt is to increase resilience of the ball and lower the cost of production.

In a further embodiment, an inner cover layer is comprised of a low acid (i.e. 16 weight percent acid or less) ionomer resin or low acid ionomer blend. Preferably, an inner layer is comprised of a blend of two or more low acid (i.e. 16 weight percent acid or less) ionomer resins neutralized from 10 to 100% various extents with one or more different metal cations such as zinc, sodium, magnesium, lithium or calcium. As with the high acid inner cover layer embodied, the inner cover layer may or may not include a metal stearate (e.g., calcium stearate, magnesium stearate) or other metal fatty acid salt (magnesium oleate).

In golfballs having a multi-layer cover, it has been found that a hard inner layer(s) and/or low driver spin provides for a substantial increase in resilience (i.e., enhanced distance) over known multi-layer covered balls. A softer outer layer (or layers) provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golfball having enhanced resilience (improved travel distance) and durability (i.e. cut resistance, etc.) characteristics while maintaining and in many instances, improving, the playability properties of the ball.

The combination of a hard, high energy inner cover layer with a thin, soft outer cover layer provides for excellent overall coefficient of restitution (for example, excellent resilience) because of the improved resiliency produced by the inner cover layer. While some improvement in resiliency may also be produced by the outer cover layer, the outer cover layer generally provides for a more desirable feel and high spin, particularly at lower swing speeds with highly lofted clubs such as half wedge shots. The use of a very thin outer cover allows for increased thickness of the high energy inner layers.

In one embodiment, an inner cover layer may have a thickness in the range of 0.020 to about 0.15 inches. In embodiments, the outer cover layer has a thickness of about 0.030 to about 0.10 inches for a 1.68 inch ball, and sometimes slightly thicker for a 1.75 inch (or more) ball.

In embodiments having an inner cover layer core and an inner cover layer (if applicable) together preferably form an inner or intermediate ball having a coefficient of restitution of 0.700 or more. In embodiments, an intermediate ball has a coefficient of restitution of 0.725 or more.

An intermediate ball may have a diameter in the range of 1.48 to 1.66 inches for a 1.68 inch ball and 1.50 to 1.726 inches for a 1.72 inch (or more) ball.

The inner cover layer preferably has a Shore D hardness of about 50 or more. It is particularly advantageous if the golfballs have an inner layer with a Shore D hardness of about 65 or more. In still other embodiments, a mantle layer may have a Shore D hardness of about 70 or more. In embodiments wherein a ball comprises multiple mantle layers, the mantle layer closest to the core may have a Shore D hardness of about 50 or more. These measurements are made in general accordance to ASTM 2240 except that they are made on the ball itself and not on a plaque. If the inner layer is too soft or thin, it is sometimes difficult to measure the Shore D of the inner layer as the layer may puncture during measurement. In such circumstances, an alternative Shore B measurement should be utilized. Additionally, if the core (or inner layer) is harder than the layer being measured, this will sometimes influence the reading.

Moreover, if the Shore B or Shore D is measured on a plaque of material, different values than those measured on the ball will result. Consequently, when a Shore hardness measurement is referenced to herein, it is based on a measurement made on the ball, except if specific reference is made to plaque measurements.

The above-described characteristics of the inner cover layer provide an inner ball having a PGA compression of 110 or less. In other embodiments, the inner ball has a PGA compression of 90 or less.

In one embodiment of the inner cover layer, a blend of high and low acid ionomer resins is used. These can be the ionomer resins described above, combined in a weight ratio that preferably is within the range of 10 to 90 to 90 to 10 percent high and low acid ionomer resins.

An additional embodiment comprising a blend one or more ionomers modified with high levels of a fatty acid salt (e.g., calcium stearate, magnesium stearate, sodium stearate, zinc stearate) is used. The level of neutralization of the carboxylic acid groups is within the range of 10 to 100%.

Another embodiment of the inner cover layer is a cover comprising a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which have a Shore D hardness of at least 45 and a flex modulus of greater than about 15,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the trademark HYTREL, or thermoplastic block polyamides, for example, a polyether amide such as that marketed by Elf Atochem S. A. under the trademark PEBAX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer. Although HYTREL and PEBAX are sometimes more expensive than certain ionomers, these materials typically have higher densities than ionomers and have different resiliency characteristics at low impacts, and so, may be desirable.

Additional materials suitable for use in the inner cover layer include a polyurethane, a polyurea or a blend of polyurethanes/polyureas. Polyurethanes are polymers which are used to form a broad range of products. They are generally formed by mixing two primary ingredients during processing. For the most commonly used polyurethanes, the two primary ingredients are a polyisocyanate (for example, 4,4'-diphenylmethane diisocyanate monomer ("MDI") and toluene diisocyanate ("TDI") and their derivatives) and a polyol (for example, a polyester polyol or a polyether polyol and or a polyamine).

A wide range of combinations of polyisocyanates and polyols, as well as other ingredients, are available. Furthermore, the end-use properties of polyurethanes can be controlled by the type of polyurethane utilized, such as whether the material is thermoset (cross linked molecular structure not flowable with heat) or thermoplastic (linear molecular structure flowable with heat).

Cross linking occurs between the isocyanate groups (—NCO) and the polyol's hydroxyl end-groups (—OH). Cross linking will also occur between the NH 2 group of the amines and the NCO groups of the isocyanates, forming a polyurea. Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM")) or may be on the order of several hours or longer (as in several coating systems such as a cast system). Consequently, a great variety of polyurethanes are suitable for different end-uses.

Polyurethanes are typically classified as thermosetting or thermoplastic. A polyurethane becomes irreversibly "set" when a polyurethane prepolymer is cross linked with a polyfunctional curing agent, such as a polyamine or a polyol. The prepolymer typically is made from polyether or polyester. A prepolymer is typically an isocyanate terminated polymer that is produced by reacting an isocyanate with a moiety that has active hydrogen groups, such as a polyester and/or polyether polyol. The reactive moiety is a hydroxyl group. Diisocyanate polyethers are preferred because of their water resistance.

The physical properties of thermoset polyurethanes are controlled substantially by the degree of cross linking and by the hard and soft segment content. Tightly cross linked polyurethanes are fairly rigid and strong. A lower amount of cross linking results in materials that are flexible and resilient. Thermoplastic polyurethanes have some cross linking, but primarily by physical means, such as hydrogen bonding. The crosslinking bonds can be reversibly broken by increasing temperature, such as during molding or extrusion. In this regard, thermoplastic polyurethanes can be injection molded, and extruded as sheet and blow film. They can be used up to about 400° F. and are available in a wide range of hardnesses.

Polyurethane materials suitable for the inner cover layer may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited to, diols, triols and amine extenders. Any suitable polyisocyanate may be used to form a polyurethane. The polyisocyanate may be selected from the group of diisocyanates including, but not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis(isocyanato methyl)cyclohexane; and polymethylene polyphenyl isocyanate ("PMDI").

One additional polyurethane component which can be used incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

A polyurethane which is to be used for a cover layer preferably has a flex modulus from about 1 to about 310 Kpsi, more preferably from about 3 to about 100 Kpsi, and most preferably from about 3 to about 40 Kpsi for a soft cover layer and 40 to 90 Kpsi for a hard cover layer. Accordingly, covers comprising these materials exhibit similar properties. The polyurethane preferably has good light fastness.

Non-limiting examples of a polyurethane suitable for use in the inner cover layer (or inner cover layer) include a thermoplastic polyester polyurethane such as Bayer Corporation's polyester polyurethane (such as TEXIN DP7-1097 and TEXIN 285 grades) and a polyester polyurethane such as B.F. Goodrich Company's ESTANE polyester polyurethane sold under the trademark ESTANE (such as ESTANE X-4517 grade). The thermoplastic polyurethane material may be blended with a soft ionomer or other non-ionomer. For example, polyamides blend well with soft ionomer.

Any number of inner layers may be used. Each layer may be the same or different material as any other layer, and each may be of the same or different thickness. One or more of the inner layers, if applicable, may also be the same as the outer cover layer.

A core with a hard inner cover layer formed thereon generally provides the multi-layer golfball with resilience and distance. In one embodiment, the outer cover layer is comparatively softer than the inner cover layer. For a golfball having a single cover layer and a core, the cover layer may be a soft cover layer, as described herein. The softness provides for the feel and playability characteristics typically associated with golfballs with a low modulus cover, such as balata, balata-blend, soft ionomers, and polyurethane.

The (outer) cover layer includes a reaction-injection-molded (RIM) material. In embodiments, the reaction-injection-molded material comprises a reaction-injection-molded polyurethane, a reaction-injection-molded polyurea, a reaction-injection-molded blend of polyurethane/polyurea, or mixtures thereof. RIM is a process by which highly reactive liquids are injected into a mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

A RIM polyurethane may be formed using lonely desired polyol or isocyanate, including, but not limited to, those previously described herein.

Non-limiting examples of suitable RIM systems are Vibra RIM™ reaction injection moldable polyurethane and polyurea systems from Crompton Corporation (Middlebury, Conn.), Bayflex® elastomeric polyurethane RIM systems, Baydur® GS solid polyurethane RIM systems, Prism® solid polyurethane RIM systems, all from Bayer Corp. (Pittsburgh, Pa.), Spectrim® reaction moldable polyurethane and polyurea systems from Dow Chemical USA (Midland, Mich.), including Spectrim® MM 373-A (isocyanate) and 373-B (polyol), and Elastolit® SR systems from BASF (Parsippany, N.J.). Further preferred examples are polyols, polyamines and isocyanates formed by processes for recycling polyurethanes and polyureas.

In another embodiment, at least one of the inner cover layer and/or the outer cover layer of the golfball comprises a fast-chemical-reaction-produced component. An inner layer may serve as an containment or encapsulation layer for the liquid the liquid filled core. This component comprises at least one material selected from the group consisting of polyurethane, polyurea, polyurethane ionomer, epoxy, and unsaturated polyesters, and preferably comprises polyurethane, polyurea or a blend comprising polyurethanes and/or polymers. In an exemplary form, a golfball includes a cover comprising polyurethane or a polyurethane blend.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

The (outer) cover may have a thickness of from about 0.005 to about 0.100 inches. In some embodiments, the (outer) cover has a thickness from about 0.012 to about 0.060 inches.

The final ball construction, e.g., liquid core and cover or liquid core, mantle layer(s), and cover, may have a Shore B hardness of from about 60 to about 100. In embodiments, the final ball has a C.O.R. of at least about 0.725.

The (outer) cover layer includes a plurality of dimples. The number, size, and shape of the dimples may be selected as described for a particular purpose or intended use. In embodiments, the cover may include one or more "deep dimples" and be formed using a method as described in U.S. Pat. Nos. 6,790,149 and 6,817,853, the entire disclosures of which are incorporated herein by reference.

Additional materials may also be added to the inner and outer cover layer as long as they do not substantially reduce the playability properties of the ball. Such materials include, but are not limited to, filler material, dyes and/or optical brighteners (for example, Ultramarine Blue® sold by Whittaker, Clark, and Daniels of South Plainsfield, N.J.) (see U.S. Pat. 4,679,795); pigments such as titanium dioxide, zinc oxide, barium sulfate and zinc sulfate; UV absorbers; antioxidants; antistatic agents; and stabilizers. Moreover, the cover compositions may also contain softening agents such as those disclosed in U.S. Pat. Nos. 5,312,857 and 5,306,760, including plasticizers, metal stearates, processing acids, and the like, and reinforcing materials such as glass fibers and inorganic fillers, as long as the desired properties produced by the golfball covers are not impaired.

For purposes herein, when the terms "densities" and "specific gravities" are referred to, they are referred to in "apparent densities" and "apparent specific gravities." Some of the cover stocks of this disclosure are non-uniform in that they may incorporate skins and variable cell structures. These latter terms take into consideration these variables and give the actual density and specific gravity of the average structure. The terms "apparent densities" and "apparent specific gravities" also apply to the "density" and "specific gravity" of the liquid materials injected into the shell to form the core.

As is apparent from the above discussions, two principal properties involved in golfball performance are resilience and PGA compression. The resilience or coefficient of restitution (C.O.R.) of a golfball is the constant "e," which is the ratio of the relative velocity of an elastic sphere after direct impact to that before impact. As a result, the C.O.R. ("e") can vary from 0 to 1, with 1 being equivalent to a perfectly or completely elastic collision and 0 being equivalent to a perfectly or completely inelastic collision.

C.O.R., along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golfball will travel under controlled environmental conditions is a function of the speed and mass of the club and size, density and resilience (C.O.R) of the ball and other factors.

The initial velocity of the club, the mass of the club and the angle of the ball's departure are essentially provided by the golfer upon striking. Since club head, club head mass, the angle of trajectory and environmental conditions are not determinants controllable by golfball producers and the ball size and weight are set by the U.S.G.A., these are not factors of concern among golfball manufacturers. The factors or determinants of interest with respect to improved distance are generally the coefficient of restitution (C.O.R) and the surface configuration (dimple pattern, ratio of land area to dimple area, etc.) of the ball.

The C.O.R of solid core balls is a function of the composition of the core and of the cover. The core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers. The C.O.R of the golfballs of the present disclosure is a function of the composition and physical properties of the core and cover layer materials such as flex modulus, hardness and particularly, their resilience, i.e. ability to quickly recover from a high impact deformation.

The coefficient of restitution is the ratio of the outgoing velocity to the incoming velocity. In the examples of this application, the coefficient of restitution of a golfball was measured by propelling a ball horizontally at a speed of 125.+-0.5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125.+-0.5 fps but corrected to 125 fps. The correlation between C.O.R and forward or incoming speed has been studied and a correction has been made over the +-0.5 fps range so that the C.O.R. is reported as if the ball had an incoming speed of exactly 125.0 fps.

The coefficient of restitution must be carefully controlled in all commercial golfballs if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75.degree. F. when tested on a U.S.G.A machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can affect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates. The term "compression" utilized in the golfball trade generally defines the overall deflection that a golfball undergoes when subjected to a compressive load. In the past, PGA compression related to a scale of from 0 to 200 given to a golfball. The lower the PGA compression value, the softer the feel of the ball upon striking. In practice, tournament quality balls have compression ratings around 70-110, preferably around 80 to 100.

In determining PGA compression using the 0-200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100.times.0.001 inches) has a PGA compression value of 100 (i.e., 200-100) and a ball which deflects 0.110 inches (110.times.0.001 inches) has a PGA compression of 90 (i.e., 200-110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golfball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golfball undergoes when subjected to compressive loading. The Atti test apparatus consists of a lower movable platform and an upper movable spring-loaded anvil. The dial indicator is mounted such that it measures the upward movement of the spring-loaded anvil. The golfball to be tested is placed in the lower platform, which is then raised a fixed distance. The upper portion of the golfball comes in contact with and exerts a pressure on the springloaded anvil. Depending upon the distance of the golfball to be compressed, the upper anvil is forced upward against the spring.

Furthermore, additional compression devices may also be utilized to monitor golfball compression so long as the correlation to PGA compression is known. These devices have been designed, such as a Whitney Tester or Instron Tester, to correlate or correspond to PGA compression through a set relationship or formula. For example, using an Instron Tester to measure compression, the inventors have established a relationship between PGA Compression and the Instron Tester measurement that closely matches the following formula:

PGA Compression=186.56−(1111)(Instron Measurement)

For example, if the Instron Measurement is 0.100, the PGA Compression is 75.46. If the Instron Measurement is 0.078, the PGA Compression is 99.90. The PGA Compression is also equal to 160 minus a Reihle measurement.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

Durability is determined by firing the golfballs at 125 ft/sec (at 72.degree.F.) into a five-sided steel pentagonal container, the walls of which are steel plates. The container has a 19½ inch long insert plate mounted therein, the central portion of which has horizontally extending square grooves on it which are intended to simulate a square-grooved face of a golf club. The grooves have a width 30 of 0.033 inches, a depth 32 of 0.100 inches, and are spaced apart form one another by land areas having a width of 0.130 inches. The five walls of the pentagonal container each have a length of 14½ inches. The inlet wall is vertical and the insert plate is mounted such that it inclines upward 30 degrees relative to a horizontal plane away from the opening in the container. The ball travels 15½-15¾ inches horizontally from its point of entry into the container until it hits the square-grooved central portion of the insert plate. The angle between the line of trajectory of the ball and the insert plate is 30.degree. The balls are subjected to a number of blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected.

Balls are assigned a Durability rating according to the following scale. A sample of 10-12 balls of the same type are obtained and are tested using the durability test apparatus described in the previous paragraph. If less than all of the balls in the sample survive 70 blows each without cracking, the ball is assigned a Durability Rating of 1. If all of the balls survive 70 blows and one or more of the balls cracks before 120 blows, the ball is assigned a Durability Rating of 2. If all of the balls survive 120 blows and the average for the sample is up to 150 blows, the ball is assigned a Durability Rating of 3. If all of the balls survive 120 blows and the average for the sample is up to 200 blows, the ball is assigned a Durability Rating of 4. If all of the balls survive 120 blows and the average for the sample is up to 240 blows, the ball is assigned a Durability Rating of 5. If all the balls survive 120 blows and the average for the sample is more than 240 blows, the ball is assigned a Durability Rating of 6.

In describing the components of the subject golfball herein, the term "spherical" is used in conjunction with the shell (center). It is understood by those skilled in the art that when referring to golfballs and their components, the term "spherical" includes surfaces and shapes which may have minor insubstantial deviations from the perfect ideal geometric spherical shape. In addition the inclusion of dimples on the exterior surface of the shell, to affect its aerodynamic properties, does not detract from its "spherical" shape for the purposes therein or in the art. Further the internal surface of the shell as well as the core may likewise incorporate intentionally designed patterns and still be considered "spherical" within the scope of this disclosure.

The rotational moment of inertia of a golfball is the resistance to change in spin of the ball and is conventionally measured using an "Inertia Dynamics Moment of Inertia Measuring Instrument".

For the Unique ball of this disclosure, the moment of inertia is relatively low at impact because the liquid center of the ball does not immediately rotate when the outside of the ball begins to spin. If an increased moment of inertia is desired, this may be achieved by adding high density materials to the cover and reducing the density of the liquid core to maintain the desired ball weight.

A golfball having a liquid core and a cover comprising a RIM material are further described with reference to the following examples. The examples are for the purpose of illustrating various aspects and features of golfballs with a liquid core and a cover comprising a RIM material and not for the purpose of limiting the same.

EXAMPLES

Golfball cores were prepared as follows. Core shells were prepared by a blow molding process and were formed from a high acid Iotek™ ionomer. The shells were then filled with a heavy salt solution. The filling solution was a blend of calcium chloride and water mixed at a ratio of 1/1 producing a solution specific gravity of about 1.36.

Various mantle materials were prepared having the compositions set forth in Table 1:

TABLE 1

| Mantle/Core Materials | Composition | Pts. |
|---|---|---|
| A | Surlyn 8320 | 25 |
|   | Surlyn 8945 | 20.5 |
|   | Surlyn 9945 | 35 |
|   | Surlyn 8940 | 10 |
|   | Universal White MB | 9.5 |
|   | Ca Stearate | 66.7 |
| B | Surlyn 9945 | 45.2 |
|   | Surlynn 8945 | 45.3 |
|   | White MB | 9.5 |
| C | HPF 1000 | 100 |
| D | Iotek High Acid Blend | 100 |

A cover layer was then formed over the outermost mantle layer by a reaction-injection-molding process. The cover material was a Vibra RIM 813 system available from Crompton Corporation (Middlebury, Conn.).

The compositions and various properties of the golfballs formed are shown in Table 2.

TABLE 2

| | | BALL | | | | | |
|---|---|---|---|---|---|---|---|
| | | 1 | 2 | 3 | 4 | 5 | 6 |
| Core Properties | Core Type | Blow Molded | Blow Molded. | Blow Molded. | Blow Molded | Blow Molded | Blow Molded |
| | Material | D | D | D | D | D | D |
| | Size | ~1.507 | ~1.507 | ~1.507 | ~1.400 | ~1.400 | ~1.400 |
| | Thickness | ~0.118 | ~0.118 | ~0.118 | ~0.075 | ~0.075 | ~0.075 |
| | ID | ~1.25 | ~1.25 | ~1.25 | ~1.25 | ~1.25 | ~1.25 |
| | Filling | Salt Sol. | Salt Sol. | Salt Sol. | Salt Sol. | Salt Sol. | Salt Sol. |
| | Weight | 35.1 | 35.1 | 35.1 | N/A | N/A | N/A |
| | Instrom Comp | 0.117 | 0.117 | 0.117 | N/A | N/A | N/A |
| | C.O.R. | 0.771 | 0.771 | 0.771 | N/A | N/A | N/A |
| | Nesfactor | 888 | 888 | 888 | N/A | N/A | N/A |
| | Shore D | ~75 | ~75 | ~75 | ~75 | ~75 | ~75 |
| Mantle #1 Properties | Mantle Material #1 | C | A | B | D | D | D |
| | Size | 1.640" | 1.640" | 1.640" | 1.560" | 1.560" | 1.560" |
| | Thickness | ~0.066" | ~0.066" | ~0.066" | ~0.080" | ~0.080" | ~0.080" |
| | Weight | 42.98 | 42.9 | 42.9 | 38.1 | 38.1 | 38.1 |
| | Instron Comp | 0.088 | 0.079 | 0.077 | 0.074 | 0.074 | 0.074 |
| | C.O.R. | 0.742 | 0.757 | 0.75 | 0.783 | 0.783 | 0.783 |
| | Nesfactor *1 | 830 | 836 | 827 | 857 | 857 | 857 |
| | Shore D | ~59 | ~65 | ~69-70 | ~75 | ~75 | ~75 |
| Mantle #2 Properties | Mantle Material #2 | none | none | None | C | A | B |
| | Size | — | — | — | 1.641" | 1.641" | 1.640" |
| | Thickness | — | — | — | ~0.040" | ~0.040" | ~0.040" |
| | Weight | — | — | — | 43.2 | 43.3 | 43 |
| | Instron Comp | — | — | — | 0.076 | 0.07 | 0.069 |
| | C.O.R. | — | — | — | 0.762 | 0.774 | 0.762 |
| | Nesfactor | — | — | — | 838 | 844 | 831 |
| | Shore D | — | — | — | ~60 | ~65 | ~70 |
| Ball Properties | Cover Material | RIM | RIM | RIM | RIM | RIM | RIM |
| | Size | 1.684" | 1.684" | 1.685" | 1.684" | 1.683" | 1.684" |
| | Thickness | ~0.022" | ~0.022" | ~0.022" | ~0.022" | ~0.021" | ~0.022" |
| | Weight | 46.2 | 46.3 | 46.1 | 46.1 | 45.8 | 46.1 |
| | Instron Comp | 0.078 | 0.074 | 0.073 | 0.072 | 0.073 | 0.069 |
| | C.O.R. | 0.753 | 0.771 | 0.763 | 0.764 | 0.775 | 0.771 |
| | Nesfactor | 831 | 845 | 836 | 836 | 848 | 840 |
| | Shore B | 90 | 90 | 90 | 90 | 90 | 90 |
| | Pro Driver Spin *2 | 3355 | not tested | 3597 | 3779 | 3607 | 3422 |
| | Chip Shot Spin *3 | 5225 | not tested | 5312 | 5233 | 5228 | 5273 |

*1 > Nesfactor is the sum of the Instron Compression and COR multiplied by 1000, a higher Nesfactor being preferred
*2 > Pro Driver Spin @ 235 ft/sec: Top Flite Tour = 2891 rpm (Avg of pre and post set-up)
*3 > 60 ft/sec chip shot: Top Flite Tour = 5494 rpm (Avg of pre and post set-up)

Various spin and flight properties were evaluated and compared to the TOP FLITE® TOUR GolfBall, a solid core, soft covered three piece ball with a Shore B cover hardness of around 86. Spin tests were conducted using both a Hogan Apex 520 wedge and a CALLAWAY GOLF® BIG BERTHA® Driver. The results of the spin tests are shown in Tables 3 and 4.

TABLE 3

Chip Shot Spin

| Ball Type | | Launch Angle (degrees) | Dev. Angle (degrees) | Ball Speed (fps) | Total Spin (rpm) |
|---|---|---|---|---|---|
| Top Flite Tour Pre-Test Set-up | Average | 26.0 | 6.1 | 61.8 | 5511 |
| 3 | Average | 29.9 | 5.9 | 60.2 | 5312 |
| 6 | Average | 29.5 | 5.8 | 60.5 | 5273 |
| 5 | Average | 30.0 | 6.2 | 60.3 | 5228 |
| 1 | Average | 30.2 | 6.2 | 60.6 | 5225 |
| 4 | Average | 29.6 | 6.1 | 60.6 | 5233 |
| Top Flite Tour Post Test Set-up | Average | 26.0 | 6.2 | 61.8 | 5478 |

TABLE 4

Driver Spin

| Ball Type | | Launch Angle (degrees) | Dev. Angle (degrees) | Ball Speed (fps) | Total Spin (rpm) |
|---|---|---|---|---|---|
| Top Flite Tour Pre-Test Set-up | Average | 9.9 | 0.7 | 235.9 | 2874 |
| 3 | Average | 9.8 | 0.7 | 230.0 | 3597 |
| 6 | Average | 9.7 | 0.5 | 232.4 | 3422 |
| 5 | Average | 9.8 | 0.3 | 231.3 | 3607 |
| 1 | Average | 10.5 | 0.7 | 227.8 | 3355 |
| 4 | Average | 9.3 | 0.4 | 231.1 | 3779 |
| Top Flite Tour Post-Test Set-UP | Average | 9.9 | 0.6 | 235.8 | 2909 |

The above results demonstrate a higher driver spin and lower chip shot spin rates for the samples of the present invention compared to the solid core TOP FLITE® TOUR despite being higher in cover hardness. The balls of the present invention also displayed lower chip shot spin coupled with a higher launch angle. Using the same cover material and altering the hardness of the inner layer (or mantle layer) changes the driver spin rate while maintaining the same chip shot spin as seen in examples 4, 5 and 6.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf ball comprising:

a liquid core comprising a substantially spherical shell defining a hollow interior region and a liquid disposed within the hollow interior of the shell, the liquid comprising glycerine, where the shell can be one or more layers, the shell having at least one layer having a thickness ranging from 0.120 inch to 0.250 inch and comprising a blend of a high acid ionomer and a low acid ionomer wherein the high acid ionomer has an acid content greater than 16 weight percent acid and the low acid ionomer has an acid content of 16 weight percent or less, the core having a diameter ranging from 1.40 inches to 1.60 inches; and a cover layer disposed about the core, the cover layer comprising a material selected from the group consisting of reaction-injection-molded polyurethane, reaction-injection-molded polyurethane/polyurea, reaction-injection-molded polyurea, and combinations thereof, wherein the cover layer has a thickness of from about 0.005 inch to about 0.100 inch and a flex modulus of 40 to 90 Kpsi.

* * * * *